(12) United States Patent
Jeltsch et al.

(10) Patent No.: US 7,040,340 B2
(45) Date of Patent: May 9, 2006

(54) APPARATUS FOR THE RECYCLING OF USED WATER

(75) Inventors: Thomas Jeltsch, Oberteuringen (DE); Achim Zwerenz, Dunningen (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 10/383,267

(22) Filed: Mar. 7, 2003

(65) Prior Publication Data

US 2003/0178062 A1 Sep. 25, 2003

(30) Foreign Application Priority Data

Mar. 11, 2002 (DE) ................. 102 11 608

(51) Int. Cl.
*E03D 5/00* (2006.01)

(52) U.S. Cl. ............. 137/255; 137/259; 220/23.4; 206/504; 222/143

(58) Field of Classification Search ........... 137/255, 137/259; 220/23.2, 23.4, 23.83; 206/503, 206/504, 509; 222/143
See application file for complete search history.

(56) References Cited

U.S. PATENT DOCUMENTS

| 3,955,715 | A | * | 5/1976 | Topor ................. 222/143 |
| 4,696,740 | A | * | 9/1987 | Mochizuki et al. ......... 210/151 |
| 4,728,234 | A | * | 3/1988 | Reynard .................. 220/23.4 |
| 4,998,647 | A | * | 3/1991 | Sharp ................... 222/143 |
| 5,054,636 | A | * | 10/1991 | Netzer .................. 220/23.4 |
| 6,282,733 | B1 | * | 9/2001 | Gonzalez, Jr. ............. 210/767 |
| 6,474,505 | B1 | * | 11/2002 | Waters ................... 222/143 |

FOREIGN PATENT DOCUMENTS

| DE | 197 40 061 A | 3/1999 |
| DE | 198 36 634 A | 3/2000 |
| EP | 0 732 457 | 9/1996 |
| EP | 0 894 904 | 2/1999 |
| EP | 1 036 888 A | 9/2000 |
| WO | WO 93 11310 A | 6/1993 |

* cited by examiner

*Primary Examiner*—Kevin Lee
(74) *Attorney, Agent, or Firm*—Duane Morris LLP

(57) ABSTRACT

A grey water tank mounting and control arrangement for the recycling and storage of used water contains three plastic tanks constructed as individual standing units, which can be mechanically connected to one another and to a control unit. The tanks and the control unit contain orienting means so as to permit mutual orientation thereof in such a way that they can be fixed to one another in the correct position.

30 Claims, 6 Drawing Sheets

APPARATUS FOR THE RECYCLING OF USED WATER

BACKGROUND OF THE INVENTION

1. Field of the Invention

The invention is directed at an apparatus with the aid of which slightly dirty water, e.g. coming from bath tubs, can be treated for reuse within the home.

2. Prior Art

An apparatus for the recycling or reuse of grey water is already known (EP 732 457) This apparatus contains three tanks, which are functionally successively positioned. The degree of cleaning of the water increases between the individual tanks. The function of the tanks is linked by pipes, pumps, valves or similar means.

An apparatus is also known (EP 894904), which is constructed as a compact wall unit. In a rack are provided three tanks below which there is a space receiving the necessary pumps and controls.

SUMMARY OF THE INVENTION

It is an aspect of the invention to so further develop a grey water apparatus of this type that it can be constructed and connected easily and at limited cost. It must also be transportable to unfavorable locations.

Due to the fact that the apparatus can be formed from individual tanks and an individual control unit, it is possible to place the tanks under confined space conditions in corresponding rooms or areas. Through orienting means it is relatively easily possible to arrange the tanks in such a way that they assume their correct position, in which they can be interconnected and also connected to the domestic installation. The orienting means can be located on the actual tanks, or can be positioned on a separately provided device, e.g. a floor rail or a wall rail. The invention also covers orientation using spacers or similar means. Other orientation possibilities are also conceivable.

In order to also be able to integrate the control unit into the apparatus using simple means, according to a further development of the invention it has the same orienting means for orientation with at least one storage tank. Preferably the control unit is introduced between two storage tanks and can then have orienting means on both sides.

The orienting means are preferably constructed to complement one another on both tank sides.

According to a further development of the invention, the orienting means are constructed in self-centering manner, so that on sliding or drawing together the individual tanks and/or the control unit, even a slight divergence from a correct position still brings about a precise orientation.

According to a further development of the invention, the tanks and/or the control unit in their correctly oriented position can also be mechanically interconnected. Thus, from the individual tanks is formed a compact, self-contained and very stable block. It must be borne in mind that the tanks may be completely filled with water, i.e. have a considerable weight.

According to a further development of the invention, for increasing stability the tanks engage flat in the oriented position.

For optical reasons the oriented tanks can have a flush, through front surface.

According to a further development of the invention, the tanks are constructed as units standing on the floor. For this purpose they can have a rack with feet or other bearing surfaces. However, they can also be designed in such a way that their bottom can rest directly on the floor of a room.

According to the invention the orienting means are arranged and/or constructed on the side walls of the tank. This renders superfluous the use of additional means, such as e.g. the aforementioned spacers or the like.

For the mechanical connection of the tanks to one another and/or to the control unit, it is possible to provide joining means, which can e.g. be constituted by staples, clasps or other means on the sides, i.e. the top, bottom, front or rear of the tanks. It is also possible to place a tension strap around the outside of the tanks.

However, it is also possible and is proposed by the invention that the joining means act on the facing side walls of the tanks and/or the control unit.

As the tanks are intended to receive water and for favorable space utilization the tanks have a significant height, in order to improve stability the tanks have stiffeners to prevent the bulging of the side walls. This more particularly applies in the case of tanks located at the end of a row of tanks.

A stiffening can e.g. be brought about in that the side walls have a certain profiling. It is also possible to design the side walls in such a way that a stiffening rail can be inserted in them. For geometrical reasons said lateral rail runs in the longitudinal direction of the tanks. In order to be able to very easily position the same, the side walls of the tanks can have a corresponding groove in which said stiffening rail can be inserted.

Another possibility for the effective stiffening of the tanks is to stabilize the side walls by a through-member connecting them. Thus, said through-member passes through the actual tanks. In the case of very high tanks more than one such through-member can be provided.

The through-members offer a possibility for the mechanical interconnection of the tanks. This can be brought about by connecting or joining means, which pass through the through-member. For example, a rod can engage through the oriented through-members of all the tanks and is then screwed at the ends with a stiffening rail.

As was indicated hereinbefore the tanks are functionally interconnected by pipe connections. Such pipe connections are also used for the connection to the domestic installation or to a drain leading to the sewer. The invention proposes that the tanks are so positioned and/or arranged that in the oriented position they leave free recesses in which can be received said connecting elements or other functional parts. These include pumps, which as a result of their electrical drive and for better accessibility are not located within the tanks, but instead outside the same. The recesses can be horizontally or vertically through shafts, but can also be spatially limited recesses.

The recesses for said parts can optionally also be covered by covers, if the recesses are accessible from the front or are visible in any other way.

The recesses can be constructed as indentations in the tank side or also rear walls, or also in that the tanks have a cross-section inwardly diverging from the desired shape.

In order to make the water pipe connections between the tanks and the domestic installation, the tanks can have couplings for said fluid connections. They can also have couplings for control connections, if e.g. a water level sensor is located in a tank. The couplings for the pipe connections are preferably initially closed, because during installation it may not yet have been established where the particular tank is to be connected in the row of tanks. Precautions can be taken so as to permit the opening with little effort of the couplings, e.g. by drilling or cutting through with a cutting tool.

For the fitting of functional parts necessary or appropriate for the operation of the grey water apparatus, holders can be provided on the tanks. Said holders can be located both on the outsides and on the insides of the tanks. The holders can be constructed in such a way that the functional parts can be easily inserted, e.g. by snapping in. They can consequently be fixed in a positive or non-positive manner, without it being necessary to have additional fastening means for which tools would be necessary.

According to the invention the tanks can have an opening, which is closed by a lid or cover. These openings are preferably located in the top surface. The openings are such that the functional parts can be inserted through said opening into the tank and can also be removed in the same way.

The connections between the individual tanks can be of the plug-in type.

According to the invention the tanks can be made from plastic, preferably in one piece. It has proved particularly advantageous to manufacture the tanks using the rotational casting process.

According to the invention all the tanks can have the same height and depth. They can be combined with one another in a random manner as a result thereof. However, the width of the tanks can differ, so as to permit an optimum space utilization as a function of the size of the rooms or areas in which the apparatus is housed.

However, it is also possible for all the tanks to have an identical construction.

Another possibility for the design of the tanks consists of constructing them in pairwise symmetrical manner.

According to the invention the tanks can have a base surface such that four or three tanks and a control unit can be fitted onto a Euro-pallet.

According to a further development of the invention the tanks can be transported in the joined state. Thus, they can form a compact unit during transportation, which relieves additional fastenings.

BRIEF DESCRIPTION OF THE DRAWINGS

Further features, details and advantages of the invention can be gathered from the following description of preferred embodiments, the claims and the abstract, whose wording is by reference made into part of the content of the description, as well as the attached drawings, wherein show:

DETAILED DESCRIPTION

Figure 1:
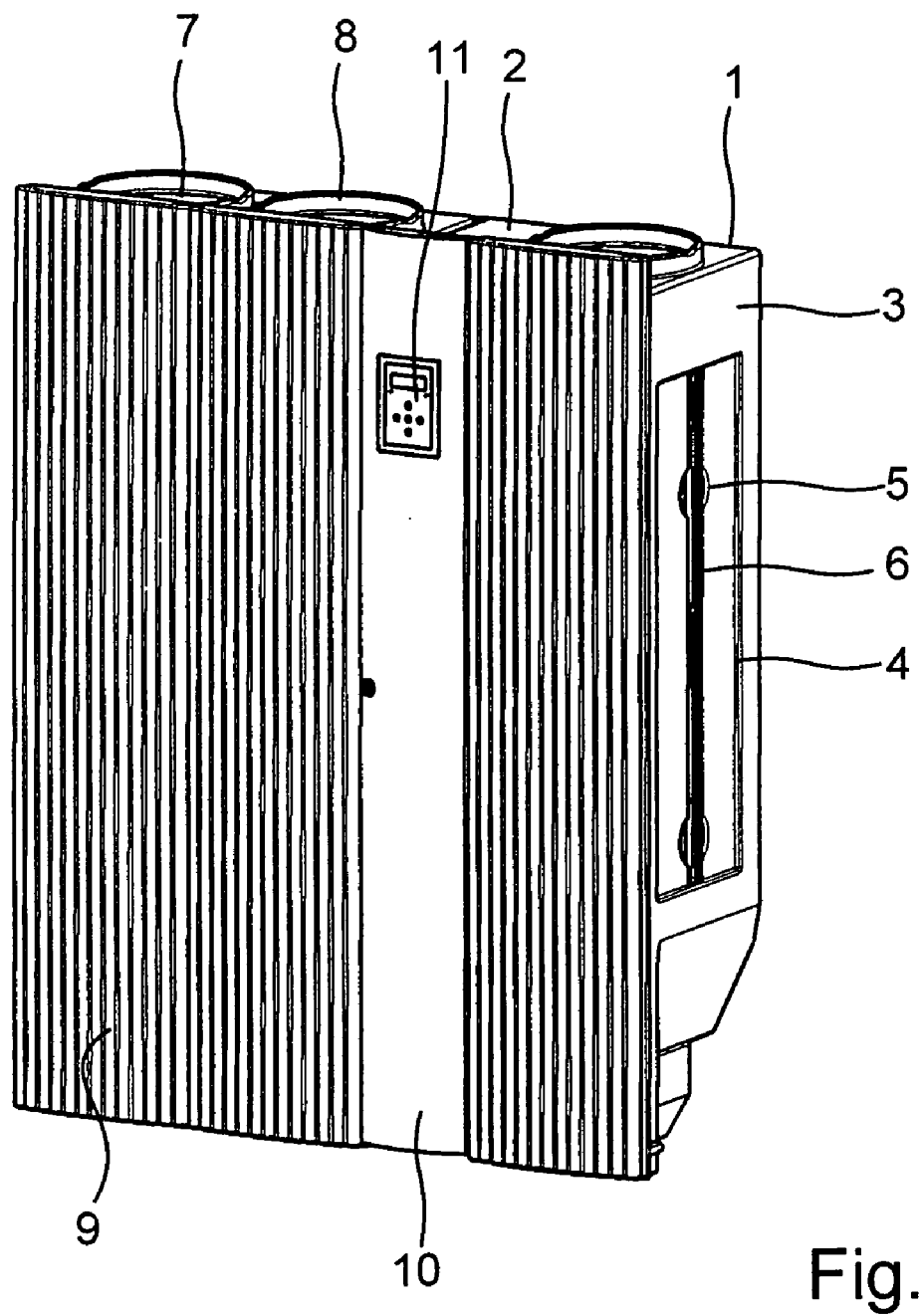
FIG. 1 is a perspective view of a grey water apparatus according to the invention comprising three tanks and a control unit.

FIG. 1 shows in a perspective view a grey water apparatus in the fitted state. The apparatus is formed from three tanks 1 and a control unit 2. The tanks 1 have a roughly rectangular cross-sectional shape and contain side walls 3, which form an outer, planar frame with a depression 4 in the centre. In said depression is provided a groove 4 running in the longitudinal direction of the tanks and in which is inserted a rail 6. The rail 6 is used for stiffening the tank side wall. In the lower area the tanks taper to form a type of funnel or hopper in order to facilitate the complete removal of water from the tanks.

In the vicinity of the top surface the tanks 1 have a round opening 7 with a cylindrical edge 8 and which can be closed by a lid or cover. The opening 7 is chosen in such a way that it extends almost completely to the edge of the tank 1.

The front side 9 of the tank is constructed as a panel provided longitudinally with a profiling. The edges of the panels 9 abut with one another and are joined together in the form of a tongue and groove joint. This gives an optically pleasing front surface leaving free no gaps between the individual components. The control unit 2 also has a front side 10, which is located roughly flush in the front of the apparatus. The front side 10 of the control unit 2 is constructed as a door and can also be opened in the assembled state of the apparatus. The front side 10 of the control unit 2 can have indicator elements 11 and also operating elements.

Figure 2:
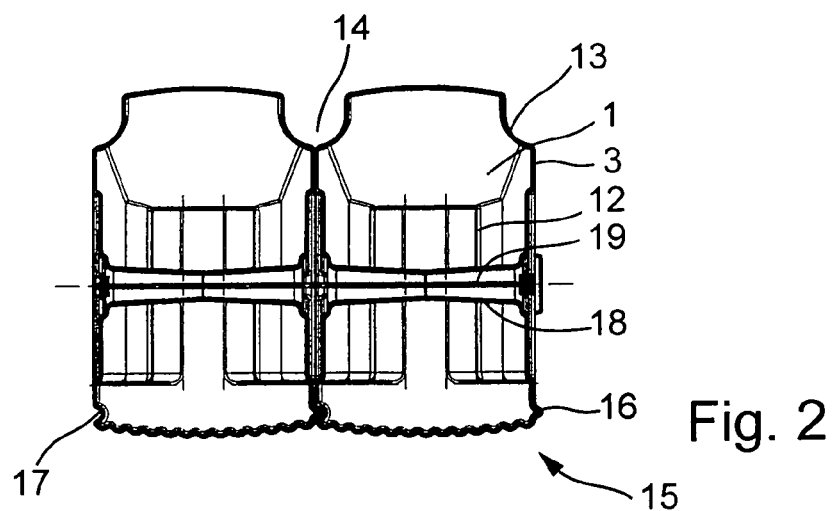
FIG. 2 is a cross-section through two juxtaposed tanks at the level of a through-member.

FIG. 2 shows a cross-section through two juxtaposed, mechanically interconnected tanks 1. The tanks 1 taper in the vicinity of their bottom in funnel-shaped manner, as is revealed in FIG. 2 by the bend lines 12. The two rear edges of the tanks 1 are hollowed out by an arcuate recess 13, so that at the connection point between two tanks is obtained a shaft running in the longitudinal direction of the tanks, i.e. from top to bottom. Said shaft 14 serves to house connecting pipes and miscellaneous devices. The tanks 1 can be moved up close to the wall. However, space for said connecting pipes is provided by the recess 13 and/or the shaft 14.

As can be seen in FIG. 2, in the vicinity of the right-hand front edge 15 of each tank there is a rounded, rib-like projection 16, which passes over the entire tank height. It runs precisely from top to bottom. On the opposite side and at a corresponding location there is a through groove 17. The rib 16 fits into the groove 17. Thus, an orientation of the two tanks can be brought about with limited effort in this way. Orientation can take place in that the left-hand tank is initially oriented with its projection 16 in such a way that the latter engages in the groove 17 of the right-hand tank. If it is not yet engaging flat on the next tank, the first tank can be pivoted about the rib 16 until the flat engagement on the side walls 3 is brought about.

The side walls 3 of each tank are interconnected by a through-member 18, which passes through the tank interior. The through-member 18 starts and finishes in the depression 4 of side wall 3. It issues into the depression 4 in such a way that its axis coincides with the groove 5 for housing the reinforcing rail 6. A bar 19 or a corresponding tie rod can be engaged through the through-members of the tanks 1. An anchoring can take place with rail 6 in such a way that a bulging of the side walls 3 of each tank is avoided through the tie rod. The tie rod simultaneously serves to mechanically interconnect the tanks and prevent bulging. In this connection it assists the through-members 18 and can also be used for the mutual orientation of adjacent tanks.

Figure 3:
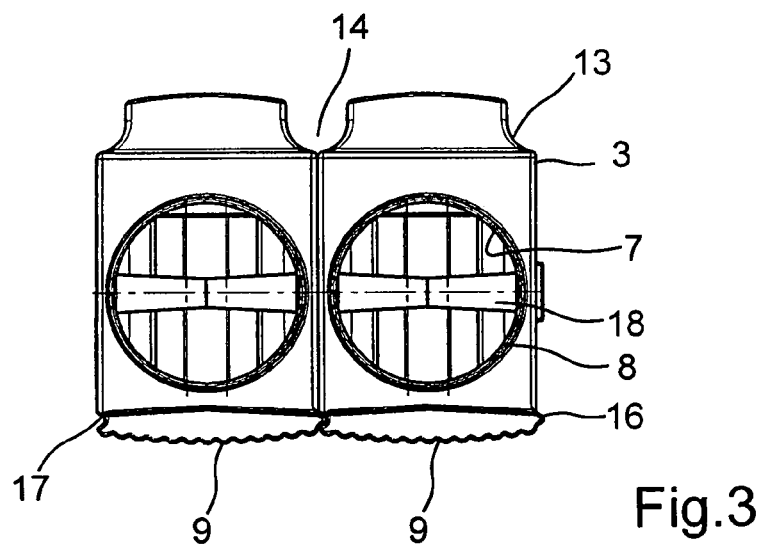
FIG. 3 is a plan view of the two tanks of FIG. 2 with the opening in the top surface open.

FIG. 3 shows a plan view of the arrangement of FIG. 2. The front walls 9 of the tanks 1 are somewhat higher than the top surface in which the openings 7 are located. It is also possible to see how the ribs 19 engages in the groove 17.

FIG. 3 reveals that the through-members are visible through the openings 7. There is sufficient space on either side of the through-members 18 to enable tools to act in the interior of the tanks 1.

Figure 4:
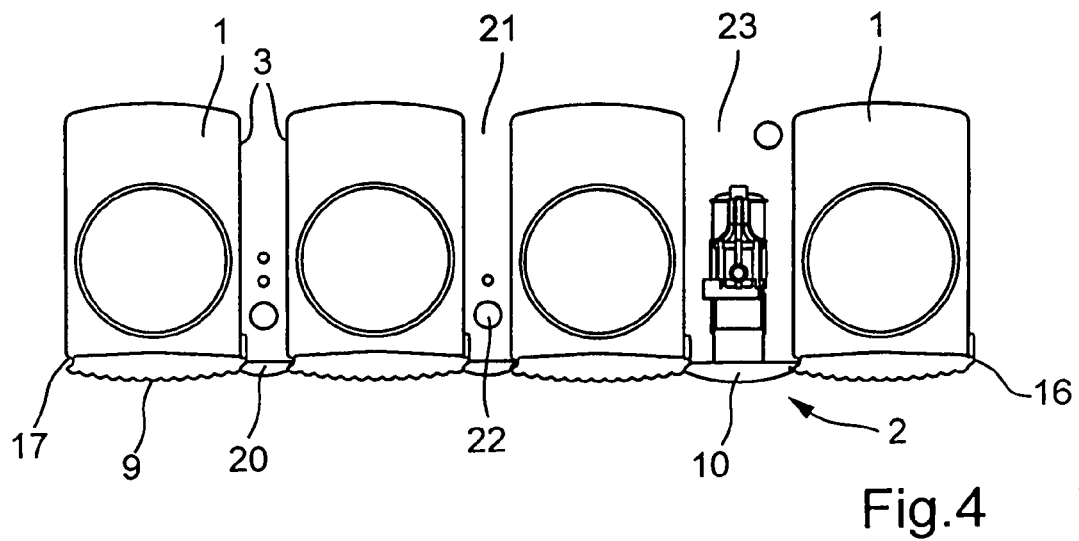
FIG. 4 is a diagrammatic plan view of the arrangement of four tanks and a control unit in another embodiment.

Whereas in the embodiment according to FIGS. 1 to 3 the side walls 3 of the tanks 1 are in engagement with one another, FIG. 4 shows an embodiment with four tanks 1, in which the mutual orientation of the containers takes place by covers 20, which cooperate with the projections 16 and the grooves 17 of the panels 9 of containers 1. The covers 20 have a width which is roughly the same as the spacing between the side walls 3 of adjacent tanks. In the gaps 21 between adjacent tanks pipes 22 are provided and constitute a fluidic connection between the tanks and the domestic installation.

A control unit 2, which has a front door 10, is also located in this case in a somewhat wider gap 23. It is possible to open the front door 10. The control unit can be located in a frame used for the mutual orientation of the tanks 1.

Figure 5:
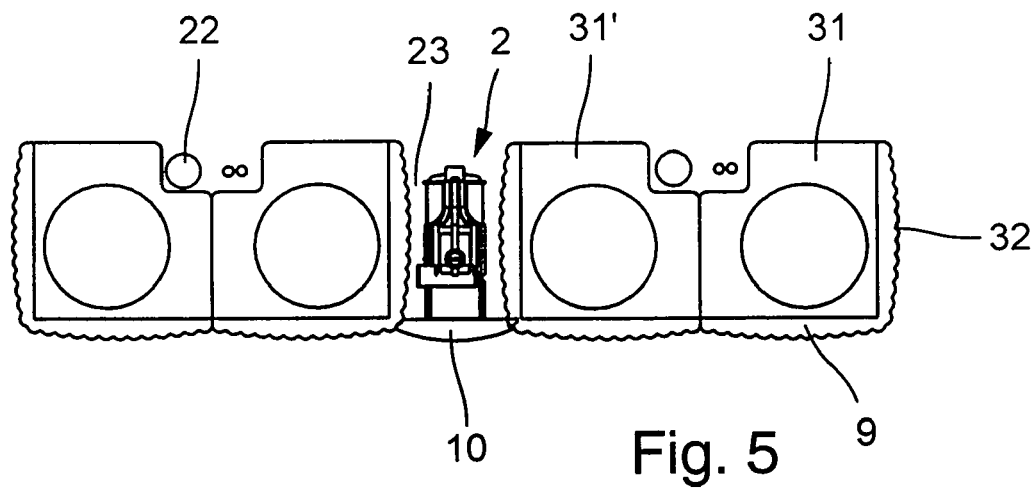
FIG. 5 is a representation corresponding to FIG. 4 of yet another embodiment.

Whereas in the embodiments discussed up to now all the tanks have an identical construction, FIG. 5 shows an arrangement with four tanks, in which in each case two tanks 31, 31' are constructed homologously to one another. Thus, only a rear edge of each tank 31, 31' has a shaft-like recess for housing pipes. The tanks 31, 31' of the embodiment according to FIG. 5 also have two profiled outsides 9, 32, so that an arrangement formed by the tanks 31, 31' of the embodiment of FIG. 5 can also be installed in a room or area, where the arrangement is visible from several sides. In the embodiment according to FIG. 5 it is also possible to arrange back to back a block comprising two flat-engaging tanks 31, 31'. In this case the pipes 22 are located within a shaft, which is not visible to the outside.

In the embodiment according to FIG. 5 the control unit 12 is housed in a gap 23 between the two blocks in each case comprising two tanks, much as in the embodiment according to FIG. 1.

Figure 6:
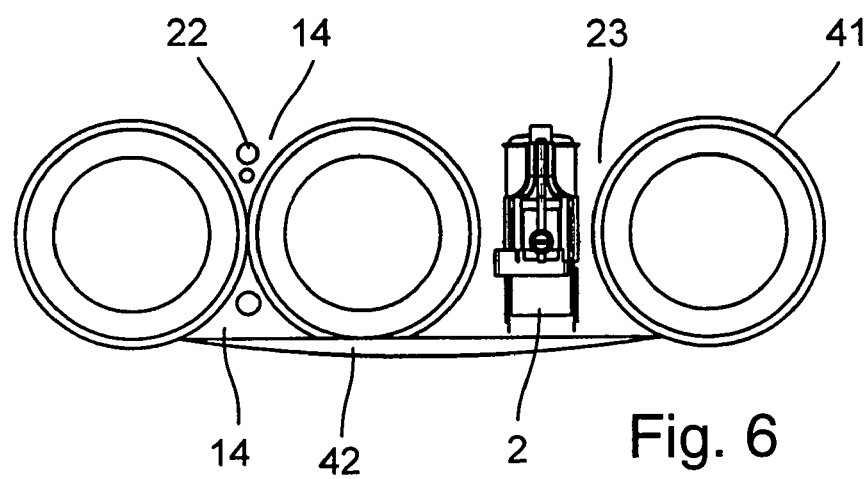
FIG. 6 is a plan view of a further embodiment.

FIG. 6 shows another embodiment in which the tanks 41 have a round cross-section. Their mutual orientation can then be brought about e.g. with the aid of spacers, feeler gauges or rails with respect to which the tanks 41 are oriented. As a result of the circular shape and even with directly mutually engaging tanks, shafts 14 are formed and can house the pipes 22.

For covering the shafts 14, which can now also be on the front side, and the gap 22 for the control unit 2 a panel 42 is provided and is put into place prior to installation. The panel 42 need not completely cover the outer tanks 41. The outside thereof can be incorporated into the optical design of the arrangement.

Figure 7:
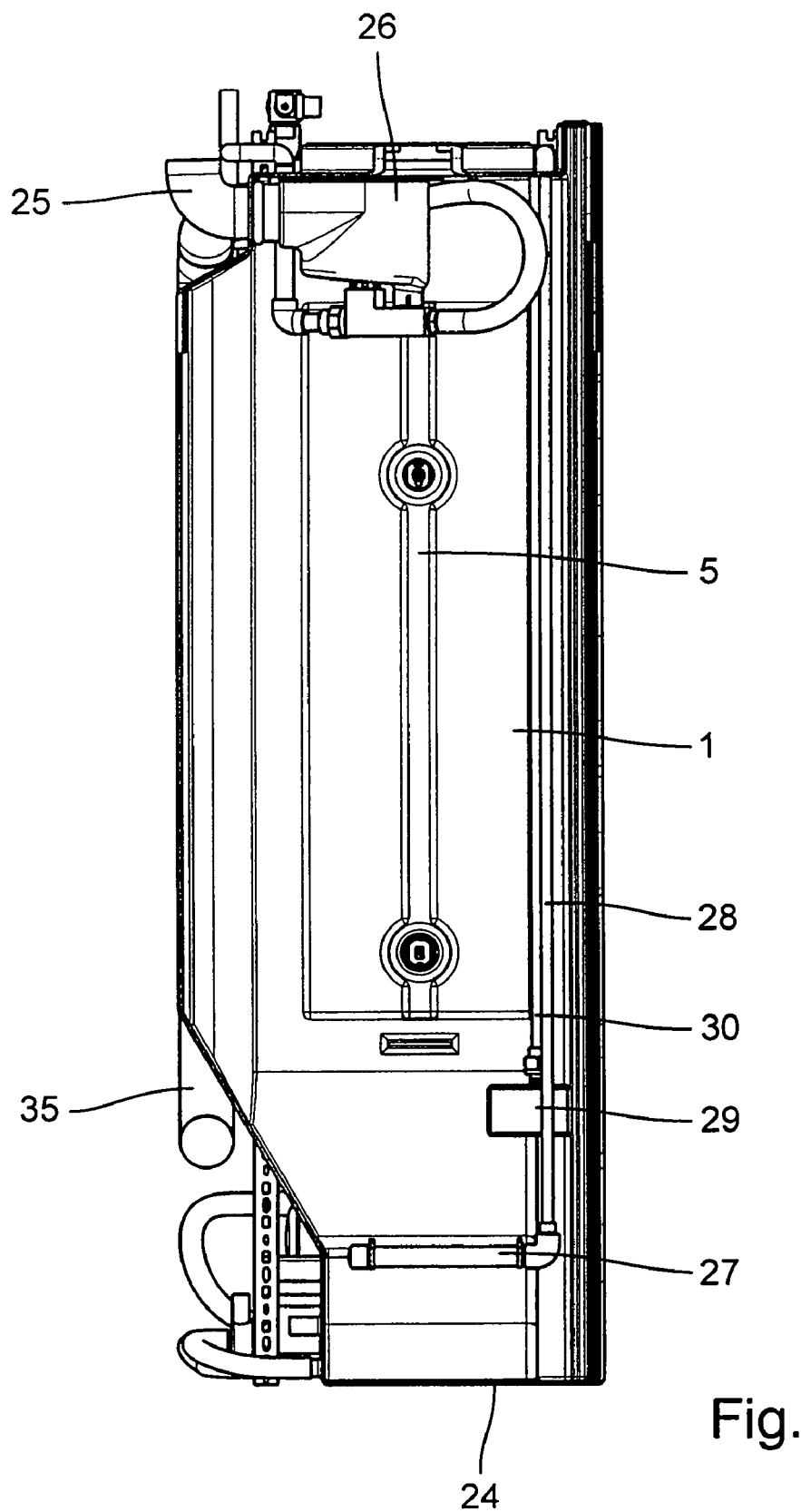
FIG. 7 is a section through a tank.

In a diagrammatic section, FIG. 7 shows the interior of a tank 1. The tank has a bottom 24, which forms the underside of the tank. By means of said bottom 24 the tank 1 can stand on a substrate. In the side wall to be seen from the inside is provided the groove 5 and the rail 6 is housed on the outside.

A coupling 25 is used for the entry of grey water, which e.g. comes from a bath tub or a wash basin. To the coupling 25 is connected a filter 26, where coarse filtering takes place of the grey water. The filtered grey water then flows into the interior of the tank. In the lower part of the tank and above the bottom 24 is provided an outlet element 27 for air, which is pumped into said outlet element 27 by means of a pipe 28.

The outlet or ventilating element 27 serves to pump air into the grey water present in the tank 1 in order to ventilate and circulate the same.

The tank also contains a submersible pump 29, which by means of a further pipe 30 pumps the partly cleaned water from said tank into an adjacent tank.

Figure 8:
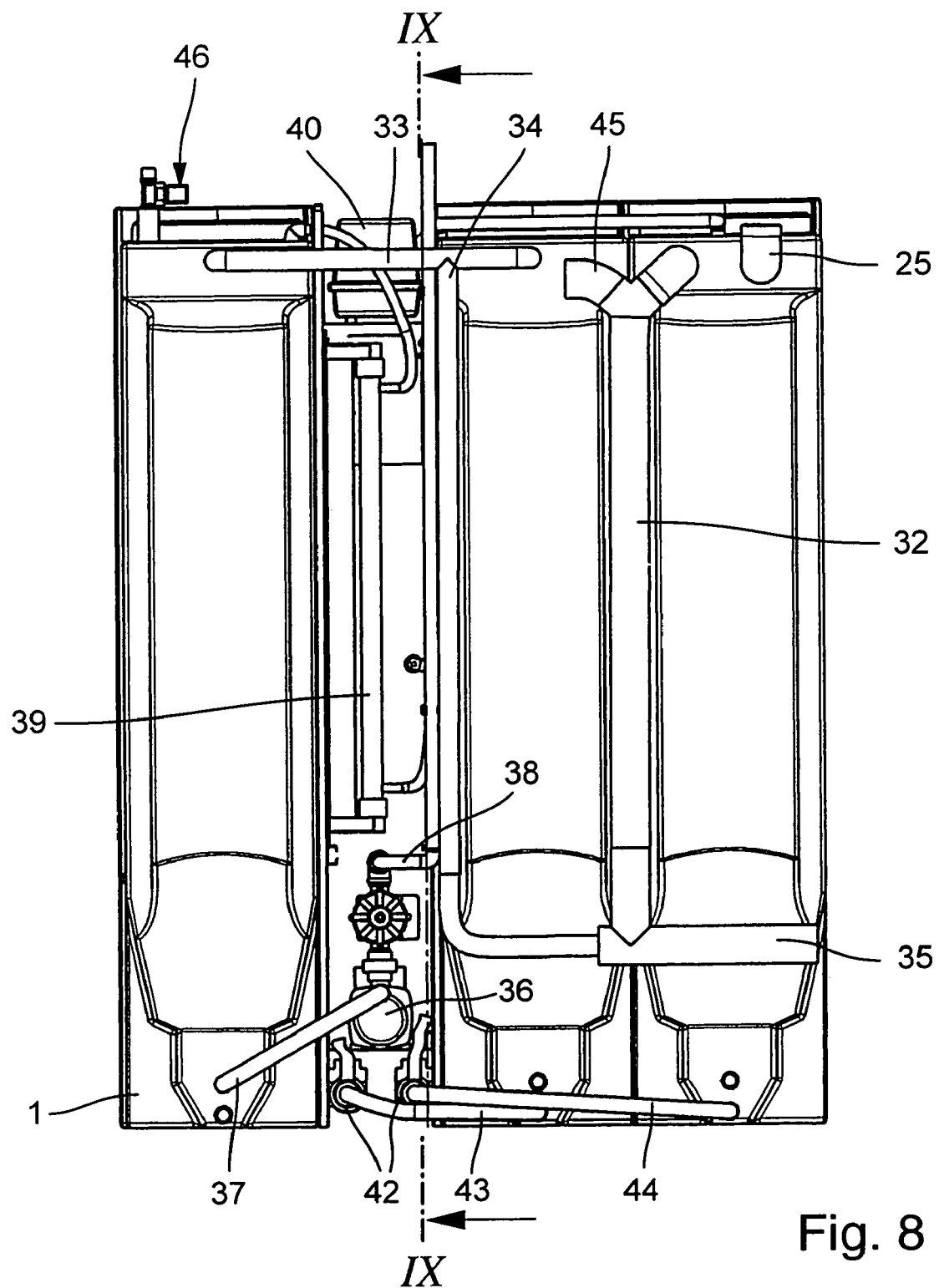
FIG. 8 is a rear view of an arrangement of an apparatus with three tanks and a control unit.
Figure 9:
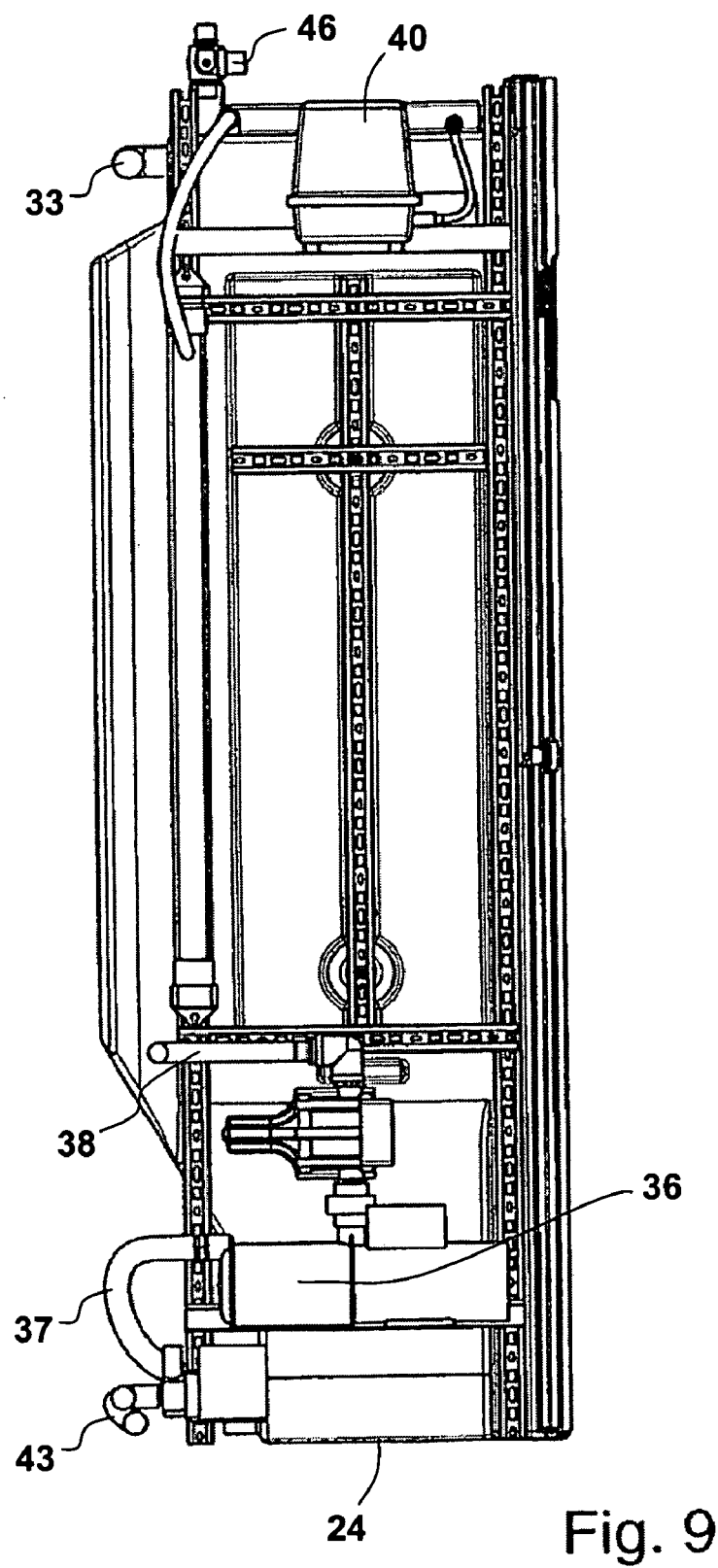
FIG. 9 is a section through the arrangement of FIG. 1 roughly along line IX—IX in FIG. 8.

In said adjacent tank, namely the second tank from the right in FIG. 8, is provided with the same arrangement a device for ventilating and circulating the water to be treated and a submersible pump for passing the treated water into the final tank, All the tanks are identical and equipped with corresponding holders for the pipes, pumps and optionally filter devices. Preferably the tanks are manufactured in a rotary casting process from plastic. However, they can also be blown or produced using some other process or some other material. The rotary casting process makes it possible to manufacture very complex shapes relatively cheaply in one piece and it is possible to cast during the production process e.g. fastening means in the form of recesses, traps, thickenings, etc., as well as the through-members, which can also be seen in section in FIG. 7.

FIG. 8 shows the arrangement from the rear. The tank visible in FIG. 7 has an overflow pipe 32, which is located in the aforementioned shaft 14. The overflow pipe 32 comes from the overflow area of the prefilter 26. The overflow pipe 32 is connected to further overflow pipes 33, 34, which connect the two tanks to the right in FIG. 8 to the discharge pipe 35, which is connected to the drain pipe of the domestic installation.

Between the left-hand tank in FIG. 8 and the two tanks located to the right is provided the control unit, which is also oriented with respect to the tanks and connected thereto. At the bottom in the gap is located the pressure pump 36, which by means of a pipe 37 pumps the water from the final tank 1 into a pipe 38. The pipe 38 leads to the consumer. In the vicinity of the control unit can be provided a UV lamp 39 past which or through which the water is pumped from the second tank into the third tank. An air pump 40 is located at the top and supplies compressed air to the aforementioned ventilating devices.

Below the pressure pump 36 are provided two sludge pumps 42, which by means of corresponding pipes 43, 44 extract the sludge produced from the two tanks to the right in FIG. 8 and pump said sludge into a coupling 45 of the overflow pipe 32 or discharge pipe 35.

On the left-hand tank 1 in FIG. 8, there is also a possibility of a drinking water feed at 46.

All the pipe and hose connections are preferably of the plug-in type, so that installation can easily take place in situ.

What is claimed is:

1. A grey water apparatus, with at least two storage tanks for grey water and a control unit, comprising fluid and control connections between the tanks and the control unit of the apparatus, wherein at least the storage tanks have pairwise cooperating means for mutual orientation of in each case two said storage tanks positioned side by side.

2. The grey water apparatus according to claim 1, wherein the control unit has a same said means for mutual orientation, with at least one of said storage tanks, at least at one side.

3. The grey water apparatus according to claim 1, wherein the pairwise cooperating means for mutual orientation are constructed in such a way that they are self-centering.

4. The grey water apparatus according to claim 1, wherein the oriented tanks are mechanically interconnectable.

5. The grey water apparatus according to claim 1, wherein the control unit is mechanically connectable to at least one said storage tank in the oriented position.

6. The grey water apparatus according to claim 1, wherein the tanks engage flat with one another in the oriented position.

7. The grey water apparatus according to claim 1, wherein the oriented tanks have a flush, through front surface.

8. The grey water apparatus according to claim 1, wherein the tanks are constructed as surface-standing units.

9. The grey water apparatus according to claim 1, wherein the pairwise cooperating means for mutual orientation are arranged on side walls of the tanks.

10. The grey water apparatus according to claim 1, wherein a joining means for mechanical joining of the tanks engages on at least one of a top, bottom, front and back of the tanks.

11. The grey water apparatus according to claim 1, wherein a joining means for mechanical joining of the tanks engages on mutually facing side walls of the tanks.

12. The grey water apparatus according to claim 1, wherein the tanks have stiffening to prevent the bulging of side walls of the tanks.

13. The grey water apparatus according to claim 12, wherein the stiffening is formed by a through-member linking the side walls within the tank.

14. The grey water apparatus according to claim 10, wherein the joining means pass through the through-member.

15. The grey water apparatus according to claim 1, wherein the tanks have recesses arranged so that in the oriented position the recesses are free for elements usable for functioning of the apparatus.

16. The grey water apparatus according to claim 15, wherein the recesses can be covered by covers.

17. The grey water apparatus according to claim 1, wherein the tanks have couplings for at least one of fluidic connection and control connection.

18. The grey water apparatus according to claim 17, wherein the couplings are closed and can be subsequently opened.

19. The grey water apparatus according to claim 1, further comprising holders on at least one of insides an outsides of the tanks for fitting functional parts of the apparatus.

20. The grey water apparatus according to claim 19, wherein the functional parts can be fitted without using a tool in the holders.

21. The grey water apparatus according to claim 1, wherein the tanks have an opening which can be covered by a lid and through which functional parts can be introduced.

22. The grey water apparatus according to claim 1, wherein fluidic connection between the tanks is of a plug-in type.

23. The grey water apparatus according to claim 1, wherein each of a plurality of the tanks comprises a one piece rotary cast plastic portion.

24. The grey water apparatus according to claim 1, wherein all said tanks have a same height and depth.

25. The grey water apparatus according to claim 1, wherein all said tanks have an identical construction.

26. The grey water apparatus according to claim 1, wherein the tanks are pairwise symmetrical.

27. The grey water apparatus according to claim 1, wherein the tanks are dimensioned in such a way that four tanks fit onto a Euro-pallet.

28. The grey water apparatus according to claim 1, wherein the tanks are dimensioned in such a way that three tanks and a control unit fit on a Euro-pallet.

29. The grey water apparatus according to claim 1, wherein the tanks are transportable in a joined state.

30. The grey water apparatus according to claim 1, wherein the control unit can be opened when joined to at least one adjacent said storage tank.

* * * * *

UNITED STATES PATENT AND TRADEMARK OFFICE
CERTIFICATE OF CORRECTION

PATENT NO. : 7,040,340 B2
APPLICATION NO. : 10/383267
DATED : May 9, 2006
INVENTOR(S) : Thomas Jeltsch and Achim Zwerenz It is certified that error appears in the above-identified patent and that said Letters Patent is hereby corrected as shown below:

In the Assignee name line (73) on page 1, delete "Hansgrolie AG" and insert --Hansgrohe AG --.

Signed and Sealed this

Twelfth Day of September, 2006

JON W. DUDAS
*Director of the United States Patent and Trademark Office*